United States Patent [19]

Ogata et al.

[11] Patent Number: 4,528,956
[45] Date of Patent: Jul. 16, 1985

[54] METHOD OF AND APPARATUS FOR CONTROLLING AIR-FUEL RATIO AND IGNITION TIMING IN INTERNAL COMBUSTION ENGINE

[75] Inventors: Masami Ogata, Toyota; Toshiaki Mizuno, Nagoya, both of Japan

[73] Assignees: Toyota Jidosha Kabushiki Kaisha, Toyota; Nippondenso Co., Ltd., Kariya, both of Japan

[21] Appl. No.: 600,076

[22] Filed: Apr. 13, 1984

[30] Foreign Application Priority Data

Apr. 19, 1983 [JP] Japan ................................. 58-68752

[51] Int. Cl.$^3$ ..................... F02M 51/02; F02M 51/00; F02D 9/02; F02P 5/04
[52] U.S. Cl. ................................. 123/440; 123/478; 123/418; 123/480
[58] Field of Search .............. 123/478, 440, 415, 409, 123/416, 418, 480

[56] References Cited

U.S. PATENT DOCUMENTS

| | | | |
|---|---|---|---|
| 3,730,154 | 5/1973 | Vartanian ............................ | 123/409 |
| 3,902,469 | 9/1975 | Scott, Jr. ............................. | 123/409 |
| 4,201,315 | 4/1981 | Geiger et al. ....................... | 123/478 |
| 4,351,296 | 9/1982 | Kayanuma .......................... | 123/409 |
| 4,367,716 | 1/1983 | Tasuhara ............................. | 123/478 |
| 4,389,996 | 6/1983 | Taegashi et al. .................... | 123/478 |
| 4,392,471 | 7/1983 | Miyagi et al. ....................... | 123/440 |
| 4,452,211 | 6/1984 | Wataya ............................... | 123/440 |
| 4,465,051 | 8/1984 | Hasegawa ........................... | 123/478 |

Primary Examiner—Raymond A. Nelli
Attorney, Agent, or Firm—Cushman, Darby & Cushman

[57] ABSTRACT

The air-fuel ratio of an air-fuel mixture to be supplied to a combustion chamber is controlled in accordance with a feedback control mode or a lean control mode. In the feedback control mode, the air-fuel ratio is feedback-controlled to be maintained around the stoichiometric air-fuel ratio. In the lean control mode, the air-fuel ratio is controlled to be maintained at a leaner side of the stoichiometric air-fuel ratio. Ignition plugs are ignited at a first ignition timing which is comparatively advanced in the lean control mode and at a second ignition timing which is behind the first ignition timing in the feedback control mode.

The ignition plugs are ignited at the second ignition timing for a predetermined period of time after switching from the lean control mode to the feedback control mode and at the first ignition timing for a predetermined period of time after switching from the feedback control mode to the lean control mode.

10 Claims, 16 Drawing Figures

FIG.11A LEAN CORRECTION COEFFICIENT FLEAN

FIG.11B LEAN CORRECTION ADVANCE ANGLE THL

FIG.11C LEAN CORRECTION ADVANCE ANGLE THL

FIG.14

METHOD OF AND APPARATUS FOR CONTROLLING AIR-FUEL RATIO AND IGNITION TIMING IN INTERNAL COMBUSTION ENGINE

BACKGROUND OF THE INVENTION

The present invention relates to a method of and an apparatus for controlling an air-fuel ratio and an ignition timing in an internal combustion engine. More particularly, the invention is concerned with a method of and an apparatus for controlling air-fuel ratio and an ignition timing in an internal combustion engine, wherein the mode of control of the air-fuel ratio is switched in accordance with the state of the engine operation between a feedback control for maintaining the air-fuel ratio substantially at the same level as the stoichiometric level or an open loop control in which no feedback is conducted and a lean control for maintaining the air-fuel ratio at the leaner side of the stoichiometric level, and wherein the ignition is conducted at different ignition timings matching for respective control modes.

Generally, in automotive engines equipped with an exhaust gas scrubber of ternary catalyst type, it is necessary to effect the air-fuel ratio control such that the air-fuel ratio, which is directly related to the condition of combustion in the engine, is always maintained around the stoichiometric level, in order to keep the exhaust emissions clean.

To cope with this demand, a feedback control method has been proposed in which the oxygen content in the exhaust gases is detected by an $O_2$ sensor as an index of the air-fuel ratio of the mixture, and the air-fuel ratio control is conducted in accordance with the output from the $O_2$ sensor such that the air-fuel ratio coincides with the stoichiometric ratio. When the engine is operating under comparatively light load, it is possible to decrease the rate of fuel consumption by maintaining the air-fuel ratio at the leaner side of the stoichiometric value without being accompanied by substantial degradation of the exhaust emissions because, under the light load, the rate of generation of nitrogen oxides is sufficiently small.

Under these circumstances, an automotive engine has been proposed in which the control operation mode is selectively switched between the feedback control mode for maintaining the air-fuel ratio substantially at the stoichiometric level and the lean control mode for maintaining the mixture at the leaner side of the stoichiometric level through a feed-forward control, thereby to decrease the rate of fuel consumption.

In the operation of the engine employing the air-fuel ratio control explained above, the ignition timing in the lean control mode is advanced as compared with that in the feedback control mode. The degree of advance angle for the ignition timing is greater as the air-fuel ratio becomes greater. When the control mode is changed from the lean control mode to the feedback control mode or vice versa, the ignition timing is controlled simultaneously with the switching of the control mode.

If the engine has a comparatively large length of the intake passage leading from the fuel injector to the combustion chamber, it takes a substantial time for the fuel injected from the fuel injector to reach the combustion chamber. Therefore, when the control mode is switched from the lean control mode to the feedback control mode depending on the state of the engine operation, an ignition plug is ignited at the retarded advance angle optimum for feedback control mode upon switching of the control mode, while the feedback-controlled fuel reaches the combustion chamber after the change of the ignition timing. Therefore, the inconveniences such as a decrease of the torque and degradation of the response characteristics of the engine take place in the transient period until the effect of the feedback control becomes appreciable. To the contrary, when the control mode is changed from the feedback control to the lean control, the ignition plug is ignited at the advanced advance angle optimum for lean control mode upon switching the control mode, while the decreased fuel by the lean control mode reaches the combustion chamber after the change of the ingition timing. Therefore, knocking may occur in the engine in the transient period until the effect of the lean control becomes appreciable.

These problems are encountered also in the air-fuel ratio controller in which the control mode is switched in accordance with the state of the engine operation between the lean control mode and an open loop control mode in which the fuel is supplied to achieve a stoichiometric air-fuel ratio in accordance with the engine speed and the load level without detecting the air-fuel ratio.

SUMMARY OF THE INVENTION

Accordingly, an object of the invention is to provide a method of controlling the air-fuel ratio and the ignition timing, improved to avoid any degradation of the performance of the engine in the transient period at the time of switching of the control mode between the feedback control mode or the open loop control mode and the lean control mode.

It is a second object of the invention to provide an apparatus for controlling the air-fuel ratio and the ignition timing improved to avoid any degradation of the performance of the engine in the transient period at the time of switching of the control mode between the feedback control mode or open loop control mode and the lean control mode.

The invention is applicable to such an engine in which the control mode of the air-fuel ratio control is switched between the feedback control in which the air-fuel ratio is feedback-controlled in accordance with the detected value of the air-fuel ratio so as to be maintained around the stoichiometric level or the open loop control in which the fuel supply is controlled to attain an air-fuel ratio approximating the stoichiometric ratio without detecting the air-fuel ratio, and the lean control in which the air-fuel ratio is controlled so as to be maintained at the leaner side of the stoichiometric value. According to the invention, when the control mode is switched from the feedback control or the open loop control and the lean control and vice versa, the ignition timing matching for the control mode before the switching is maintained for a predetermined period of time after the switching. Thus, in the internal combustion engine having a comparatively long distance between the fuel supply means including the injector and the combustion chambers, i.e. in the engines in which there is a delay of transportation of the fuel, it is possible to delay the switching of the ignition timing in conformity with the delay of transportation of the fuel. With this arrangement, it is possible to prevent the aforementioned undesirable degradation of the performance of the engine which is inevitable in the conventional air-fuel ratio controller in the transient period after the switching of the control mode.

These and other objects, features and advantages of the invention will become clear from the following description of the preferred embodiments taken in conjunction with the accompanying drawings.

DESCRIPTION OF THE PREFERRED EMBODIMENTS

Figure 1:
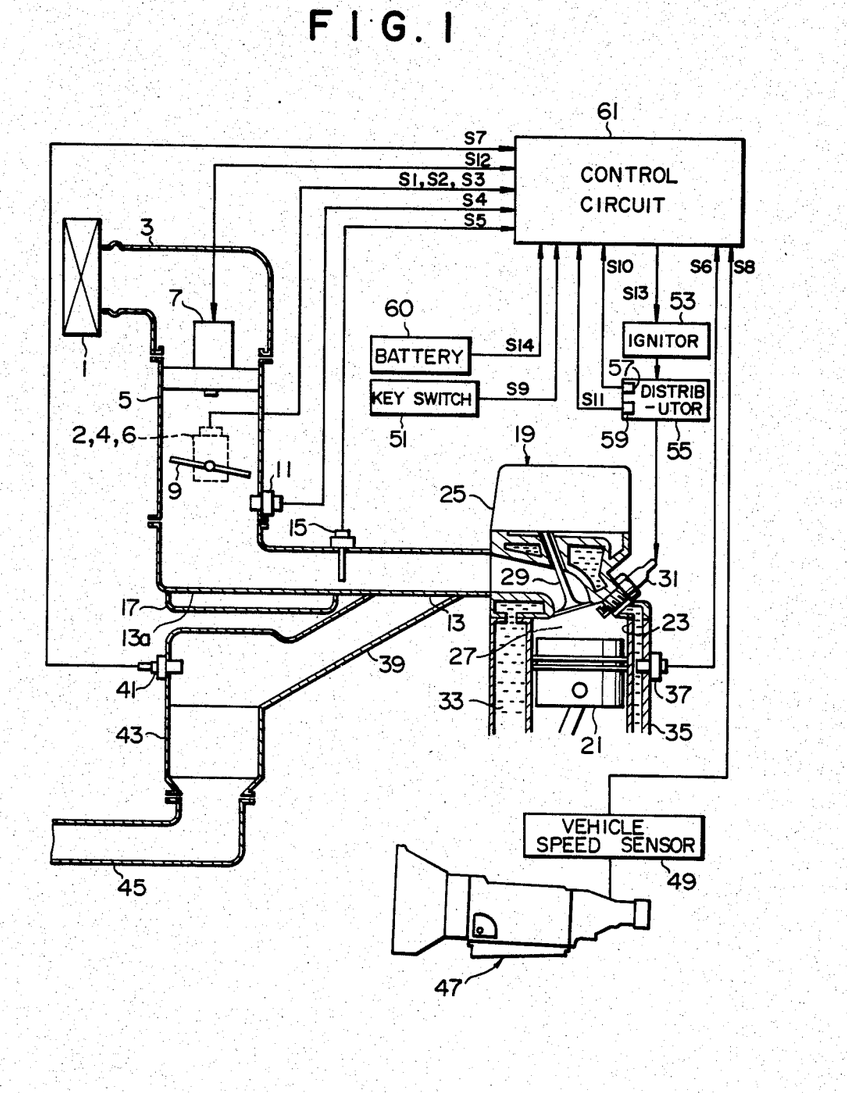
FIG. 1 is a schematic block diagram of an automotive internal combustion engine to which the present invention is applied.

FIG. 1 shows an example of automobile engine incorporating an electronic fuel injection controller in accordance with the invention. An air filter 1 is connected through an inlet pipe 3 to a throttle body 5. The throttle body 5 is provided at the upstream side portion thereof with a fuel injector 7. A throttle valve 9 disposed at the downstream side of the fuel injector 7 is adapted to be operated by an accelerator pedal (not shown) so as to control the rate of supply of the intake air. An absolute intake pressure sensor 11 is disposed at the downstream side of the throttle valve 9 to sense the absolute intake pressure at that portion of the intake passage.

The throttle valve 9 is associated with an idle switch 4 which is adapted to be held in "on" state only when the throttle valve 9 is in the full closing position, and a power switch 6 which is adapted to take "on" state only when the opening degree of the intake throttle valve 9 is 40° or greater.

The throttle body 5 is connected to an intake manifold 13 having branch pipes connected to respective cylinders of the engine. An intake air temperature sensor 15 is disposed in the intake manifold 13 to sense the temperature of the intake air flowing in the intake manifold 13. An engine cooling water heated by the engine is circulated through a riser 17 provided on the bottom wall 13a of the intake manifold upstream from the junction, thereby to heat the mixture flowing in the intake manifold 13.

An engine is generally designated at a reference numeral 19. As is well known, the engine 19 has combustion chambers 27 (only one of them is shown) defined by pistons 21, cylinders 23 and the cylinder head 25. The mixture induced into the combustion chamber 27 through the intake valve 29 is ignited by an ignition plug 31. The cooling water is circulated through a water jacket 33 formed around the cylinder 23 thereby to cool the parts including the cylinder 23. A cooling water temperature sensor 37 attached to the outer wall of the cylinder block 35 is adapted to detect the temperature of the cooling water in the water jacket 33 as the representative or index of the engine temperature.

Branch pipes of an exhaus manifold 39 are connected to the exhaust ports (not shown) of the cylinder heads 25. An $O_2$ sensor for sensing the oxygen content in the exhaust gas is disposed at the downstream side portion of the exhaust manifold 39. The exhaust manifold 39 is connected through a ternary catalyst 43 to an exhaust pipe 45.

A reference numeral 47 designates a transmission conected to the engine 19. A vehicle speed sensor 49 is attached to the final output shaft of the transmission 47 to detect the speed of rotation of the final output shaft as the speed of the automobile. Reference numerals 51, 52 and 53 designate, respectively, a key switch, an igniter and a distributor. The distributor 55 is provided with an Ne sensor 57 which is adapted to produce an on-off signal for each of a predetermined crank angle $\theta_1$. It is possible to know the angular position of the crank, as well as the engine speed, from the output of the Ne sensor 57. The distributor 55 is equipped also with a G sensor 59 which is adapted to produce an on-off signal at each of a predetermined crank angle $\theta_2$ which is greater than the above-mentioned crank angle $\theta_1$. It is possible to identify the cylinder and to detect the top dead center from the output of the G sensor 59.

A reference numeral 60 designates a series of battery.

A control circuit 61 is connected to various parts such as the idle switch 4, power switch 6, intake pressure sensor 11, intake air temperature 15, cooling water temperature sensor 37, $O_2$ sensor 41, vehicle speed sensor 49, key switch 51, Ne sensor 57, G sensor 59 and the battery 60. Thus, the control circuit 61 receives various signals such as an idle signal S2, power signal S3, intake pressure signal S4, intake air temperature signal S5, water temperature signal S6, air-fuel ratio signal S7, vehicle speed signal S8, start signal S9, engine speed signal S10, cylinder identification signal Sll and the battery voltage signal S14. The control circuit 61 is connected also to the injector 7 and the igniter 53 so as to conduct predetermined computations to deliver a fuel injection signal S12 and a ignition signal S13 there to.

Figure 2:
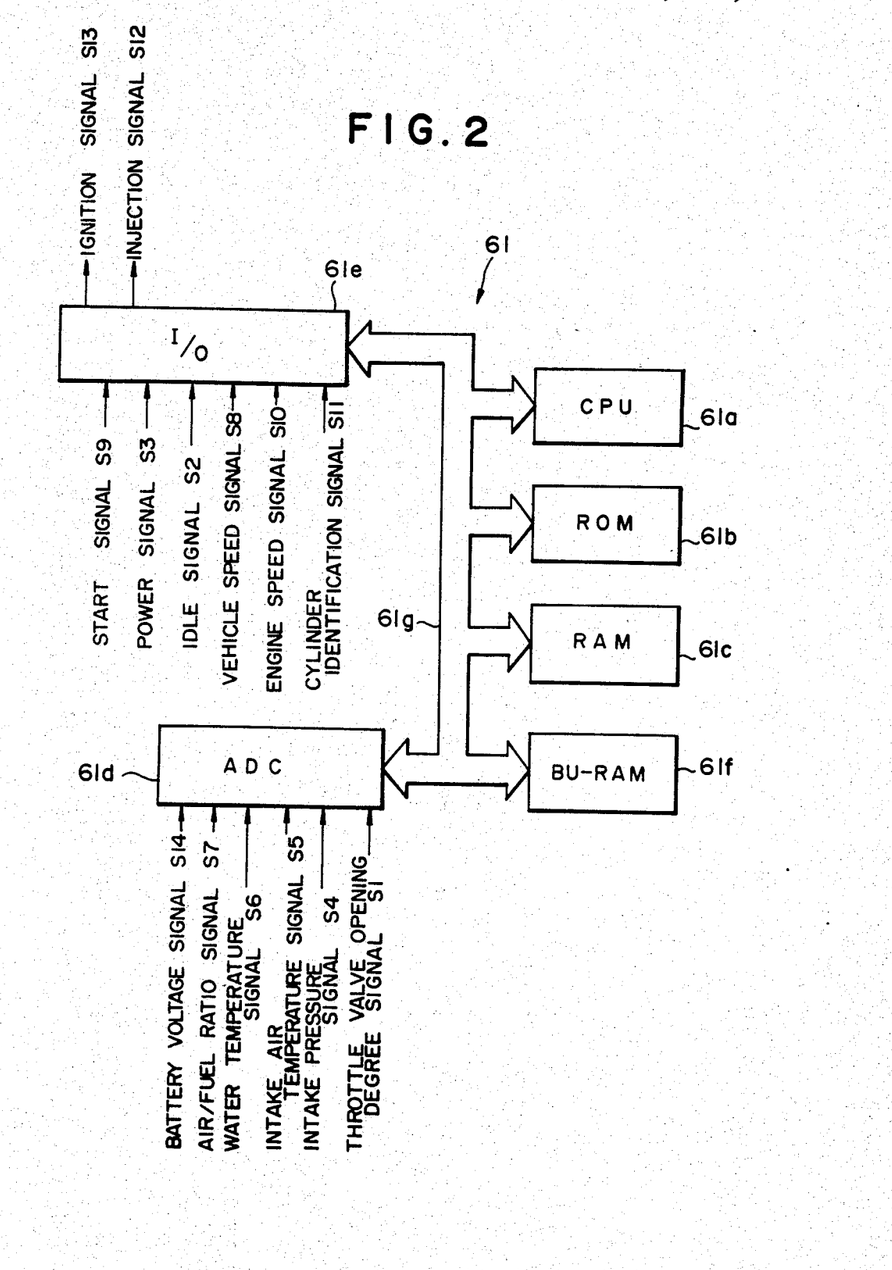
FIG. 2 is a detailed block diagram of an example of the control circuit used in the engine shown in FIG. 1.

As will be seen from FIG. 2, the control circuit 61 is composed of various parts such as a central processing unit (CPU) 61a for controlling various machines, read only memory (ROM) 61b, random access memory (RAM) 61c having areas in which numerical values and flags under processing are written, an A/D converter (ADC) 61d which converts an analog input signal into a digital signal through a time division, an input/output interface (I/O) 61e through which various signals are delivered to and from the control circuit 61, a back-up memory (BU-RAM) 61f adapted to supply an electric power from an auxiliary power supply when the engine is stopped, and a BUS line 61g through which these parts are connected. A program which will be explained later is written beforehand in the ROM 61b.

In the engine described above, the fuel injection and the ignition are conducted in accordance with computing routines shown in FIGS. 3, 5, 7 and 8.

Figure 3:
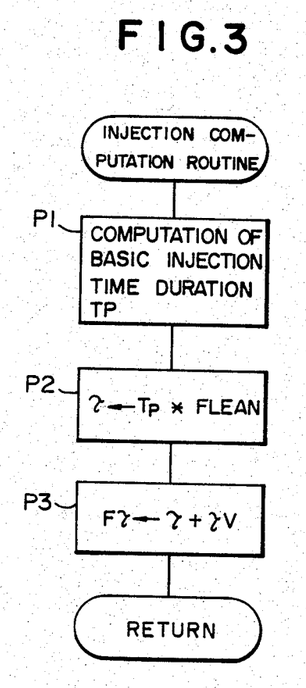
FIG. 3 is a flow chart showing an example of a fuel injection computing routine.
Figure 4:
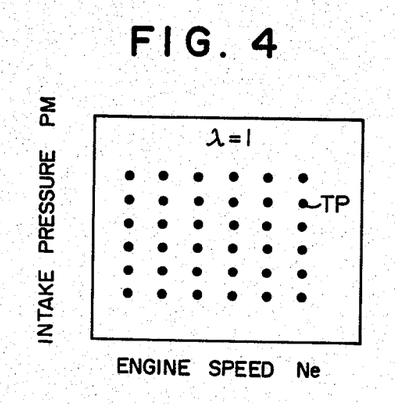
FIG. 4 is an illustration of an example of a map for determining the basic fuel injection time duration.

As an injection computing routine shown in FIG. 3 is started, in a step P1, the basic injection time duration TP is computed from a map shown in FIG. 4 in accordance with the engine speed Ne and the load PM, and the process proceeds to a step P2. In the next step P2, the basic injection time duration TP is multiplied by the lean correction coefficient FLEAN which is stored in a predetermined memory area in a manner explained later so that the corrected injection time duration $\tau$ is determined. In a step P3, a voltage correction value $\tau V$ is determined on the basis of the battery voltage detected in terms of the battery voltage S14 and is added to the corrected injection time duration $\tau$ to determine the final injection time duration F$\tau$. Then, this final injection time duration F$\tau$ is stored in a predetermined memory region to complete this computing routine.

Figure 5:
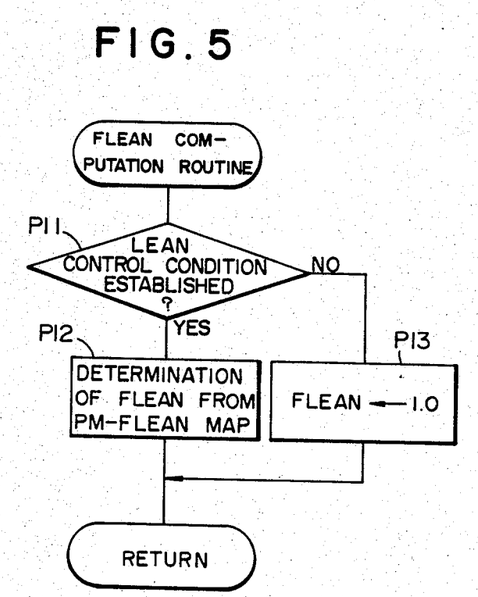
FIG. 5 is a flow chart showing an example of the routine for computing the lean correction coefficient FLEAN.
Figure 6:
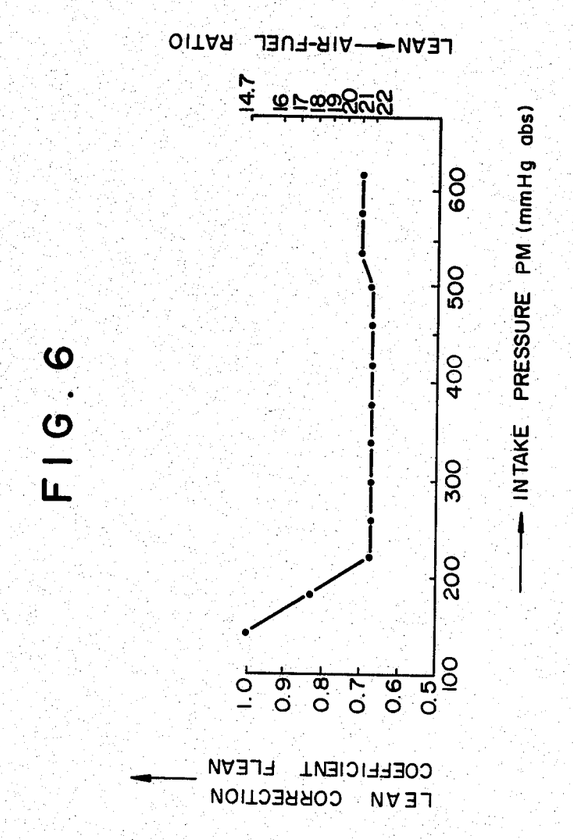
FIG. 6 is a graph showing the relationship between the intake pressure PM and the lean correction coefficient FLEAN.

As the computing routine shown in FIG. 5 for computing the lean correction coefficient FLEAN is started, a judgement is made in a step P11 as to whether the conditions for the lean control are met. These conditions are, for example, a cooling water temperature THW of not lower than 80° C., an intake pressure PM of not higher than 450 mmHg, and a throttle valve opening of not greater than 30°. If these conditions are met, the process proceeds to a step P12 in which the lean correction coefficient FLEAN is determined on the basis of the intake pressure PM from a map which shows, as will be seen from FIG. 6, the relationship between the intake pressure PM and the lean correction coefficient FLEAN. This lean correction coefficient FLEAN is then stored in a predetermined storage area to complete this routine.

If the conditions for execution of the lean control are not met in the step P11, the lean correction coefficient FLEAN is set to be 1.0 in a step P13 thereby to complete this routine.

Figure 7:
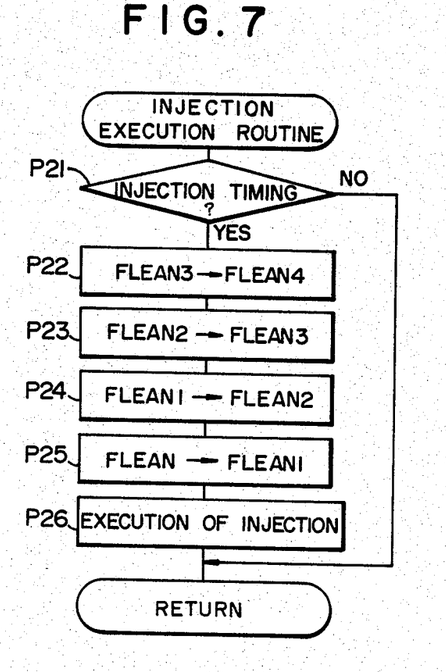
FIG. 7 is a flow chart showing an example of an injection execution routine.

As an injection execution routine shown in FIG. 7 is started, a judgement is made in a step P21 as to whether the present moment coincides with the injection timing. If the answer is affirmative, the process proceeds to a step P22 in which the value in the memory area FLEAN3 is shifted to another area FLEAN4 and the value in the storage area FLEAN2 is shifted to the area FLEAN3 in a step P23. Then, in a step P24, the value in the FLEAN1 is shifted to the area FLEAN2. Then, in a step P25, the newest lean correction coefficient FLEAN determined by the routine shown in FIG. 5 is stored in the memory area FLEAN1. Then, in a step P26, the injection signal S12 is generated in the form of a pulse signal having a pulse width correspondng to the final injection time duration F$\tau$ determined by the routine shown in FIG. 3. Then, the fuel injector 7 is driven by this signal S12 to complete this routine.

Figure 8:
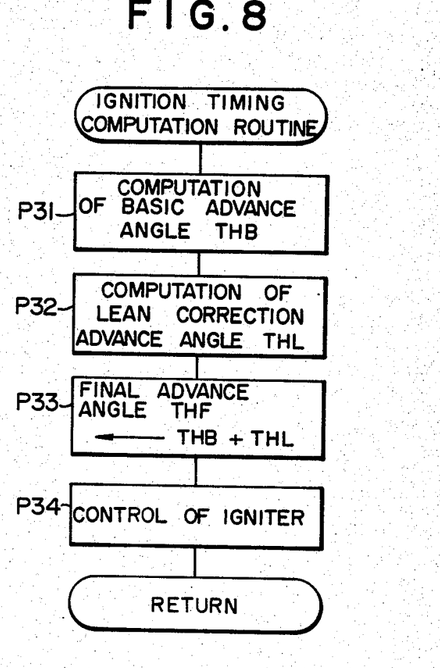
FIG. 8 is a flow chart showing an example of an ignition timing computing routine.
Figure 9:
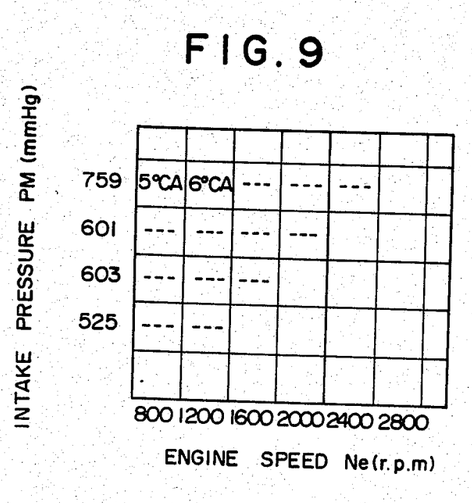
FIG. 9 is an illustration of an example of a map for determining the basic advance angle THB.
Figure 10:
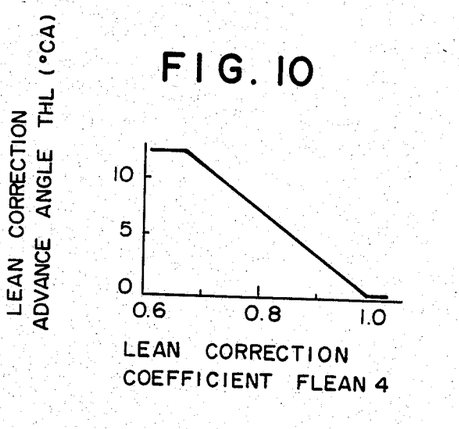
FIG. 10 is a graph showing the relationship between the lean correction coefficient FLEAN 4 and a lean correction advance angle THL.

As an ignition timing computing routine shown in FIG. 8 is started, the basic advance angle THB is determined in a step P31 on a map shown in FIG. 9 in accordance with the intake pressure PM and the engine speed Ne, and the process proceeds to a step P32. In the step P32, the lean correction advance angle THL is determined on the basis of the lean correction coefficient FLEAN stored in the memory area FLEAN4, using a map which shows, as will be seen from FIG. 10, the relationship between the lean correction coefficient FLEAN4 and the lean correction advance angle THL. In the next step P33, a computation is made to determine the value of (basic advance angle THB + lean correction advance angle THL) thereby to obtain the final advance angle THF. In the next step P34, the igniter 53 is controlled by the ignition signal to supply the electricity to the ignition plug 31.

An explanation will be made hereinunder as to the relationship between the lean correction coefficient FLEAN and the lean correction advance angle THL with specific reference to FIGS. 11A and 11B.

Figures 11A, 11B:
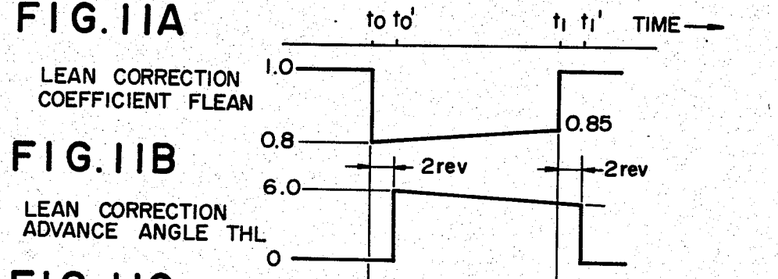
Fig. 11A is a time chart showing an example of change of the lean correction coefficient FLEAN in relation to time.
Fig. 11B is a time chart showing the change of the lean correction advance angle THL.

As will be seen from FIG. 11A, it is assumed that the lean correction coefficient FLEAN is changed from 1.0 to 0.8 at a moment $t_0$ and from 0.85 to 1.0 at a moment $t_1$. The newest data of the thus changing lean correction coefficient FLEAN is stored in the memory area FLEAN1, while the old data are successively shifted to the memory areas FLEAN2 to FLEAN4. The data of the memory area FLEAN4 is the data obtained at the moment which is 4 ignition cycles ahead of the present moment, i.e. 2 crank rotations ahead of the present moment. Therefore, by computing the lean correction advance angle THL using the data in the memory area FLEAN 4, the lean correction advance angle THL at the moment $t_0$ takes a value zero corresponding to the lean correction coefficient FLEAN which is in this case 1.0, as will be seen from FIG. 11B. At the moment $t_0'$ which lags behind the moment $t_0$ by a time length corresponding to two crankshaft rotations, the lean correction advance angle THL takes a value of 6.0 corresponding to the lean correction coefficient FLEAN of 0.8 obtained at the moment $t_0$.

Similarly, the lean correction advance angle THL is selected also when the lean correction coefficient FLEAN is changed from 0.85 to 1.0 at the moment $t_1$.

Figure 11C:
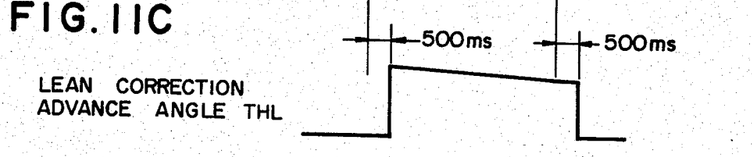
Fig. 11C is a time chart showing another example of the lean correction advance angle THL.

FIG. 11C shows another example in which the switching of the control from the lean control mode to the open loop control mode and vice versa is watched through observation of the lean correction coefficient FLEAN, and the computed lean correction advance angle THL is delayed by 500 ms during switching and during the lean control. In this case, when the control mode is changed from the lean control to the open loop control, the lean correction advance angle THL computed at the time of this switching is held for a period of 500 ms.

As will be understood from the foregoing description, the air-fuel ratio in this embodiment is usually controlled in the open loop control mode in which the fuel injector 7 is driven in accordance with the basic fuel injection time duration TP determined in accordance with the engine speed Ne and the load PM, while, under a specific condition of the engine operation, the air-fuel ratio is controlled in the lean control mode by setting the lean correction coefficient FLEAN at a level below 1.0. In addition, the ignition timing is computed by adding to the basic advance angle THB a lean correction advance angle THL which is calculated in accordance with the lean correction coefficient FLEAN obtained at the moment which is 4 ignition cycles ahead of the present moment.

Thus, in the transient period at the time of switching of the control mode from the open loop control mode to the lean control mode and vice versa, the ignition is effected at the advance angle which corresponds to the lean correction coefficient FLEAN obtained 4 ignition cycles ahead of the present moment. Thus, the ignition takes place at the timing suitable for the condition of combustion even if there is a large delay of transportation of fuel due to too large distance between the fuel injector and the combustion chamber, so that the undesirable phenomena such as decrease of the engine output torque, degradation of the response characteristics and knocking are avoided advantageously.

The invention is applicable also in the air-fuel ratio controller in which the control mode is switched between the feedback control mode and the lean control mode in accordance with the state of the engine operation. An explanation will be made hereinunder as to the feedback control of the air-fuel ratio.

Figure 12:
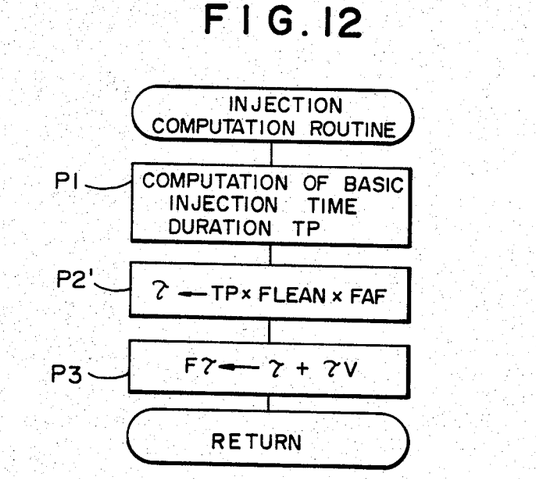
FIG. 12 is a flow chart showing another example of the injection computing routine.

FIG. 12 shows an example of the injection computing routine which is conducted under such air-fuel ratio control. Only the step P2' will be described here because other steps are materially identical with those shown in FIG. 3. In the step P2', a corrected injection time duration $\tau$ is determined by multiplying the basic fuel injection time duration TP by the lean correction coefficient FLEAN and the feedback correction coefficient FAF. The feedback correction coefficient FAF is computed in the following manner.

Figure 13:
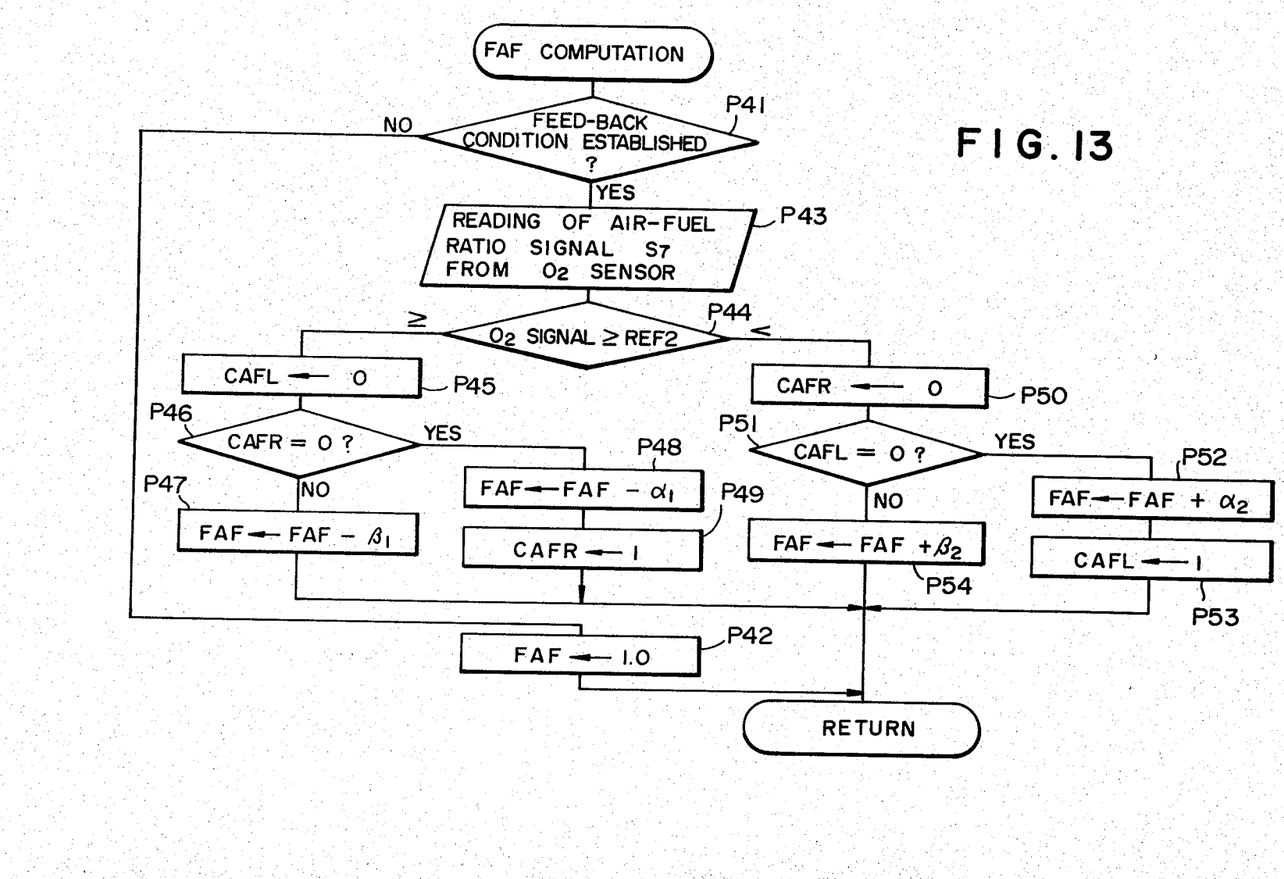
FIG. 13 is a flow chart showing an example of the routine for computing a feedback correction coefficient FAF.

An example of a routine for computing the feedback correction coefficient FAF is shown in FIG. 13. As this routine is started, a judgement is made in a step P41 to judge whether the feedback condition has been established. The condition for the feedback control is established when all of the following requirements are met: engine is not being started nor in the power incremental mode after start-up; cooling temperature is not lower than 40° C.; and the engine is not in the power incremental mode nor in the lean control mode. If the condition for the feedback control has not been established, the feedback correction coefficient FAF is set at 1.0 in the step P42 to prohibit the feedback control thereby to complete this process. On the other hand, if the condition for the feedback control has been established, the process proceeds to a step P43.

The air-fuel ratio signal S7 is read in the step P43. In a step P44, the voltage value of this air-fuel ratio signal S7 is compared with a reference value REF2. When the level of the signal S7 exceeds the reference value REF2, it is judged that the air-fuel ratio is too small, i.e. the mixture is too rich, and the process is started to increase the air-fuel ratio, i.e. to make the mixture more lean.

Namely, after setting the flag CAFL at zero in a step P45, the process proceeds to a step P46 in which a judgement is made as to whether the state of the flag CAFR is zero. If the process has been shifted to too rich side for the first time, the state of the flag CAFR is zero so that the process proceeds to a step P48 in which a predetermined value $\alpha 1$ is subtracted from the correction coefficient FAF stored in the RAM 61C and the result of this calculation is used as new correction coefficient FAF.

In the step P49, the flag CAFR is set to be 1. Therefore, if the air-fuel mixture is judged to be too rich in successive two judging cycles in the step P44, negative judgement is made without fail in the step P46 in the second and the following judging cycles, so that the process proceeds to a step P47 in which a predetermined value $\beta 1$ is subtracted from the correction factor FAF. The result of this calculation is then determined as the new correction coefficient FAF, thus completing the computation of FAF.

On the other hand, if the judgement in the step P44 proves the level of the signal S7 to be smaller than the reference value REF2, it is judged that the air-fuel ratio is too large, i.e. the mixture is too lean, so that a process is taken to decrease the air-fuel ratio, i.e. to make the mixture richer.

More specifically, the process proceeds to a step P51 after setting the flag CAFR at zero in a step P50. In the step P51, a judgement is made as to whether the state of the flag CAFL is zero or not. If the process has been shifted to the too lean side for the first time, the process proceeds to a step P52 because the state of the flag CAFL is zero. In the step P52, a predetermined value $\alpha 2$ is added to the correction coefficient FAF and the result of this addition is used as the new FAF. In a step P53, the state of the flag CAFL is set to be 1. Therefore, if the mixture is judged to be too lean in two successive judging cycles in the step P44, a negative judgement is made without fail in the second and the following judging cycles in the step P51. Then, the process proceeds to a step P54 in which a predetermined value $\beta 2$ is added to the correction coefficient FAF and the result of this addition is determined as the new FAF, thus completing the FAF operation. The values $\alpha 1$, $\alpha 2$, $\beta 1$ and $\beta 2$ used in the steps P47, P48, P52 and P54 are the values which have been determined beforehand.

Figure 14:
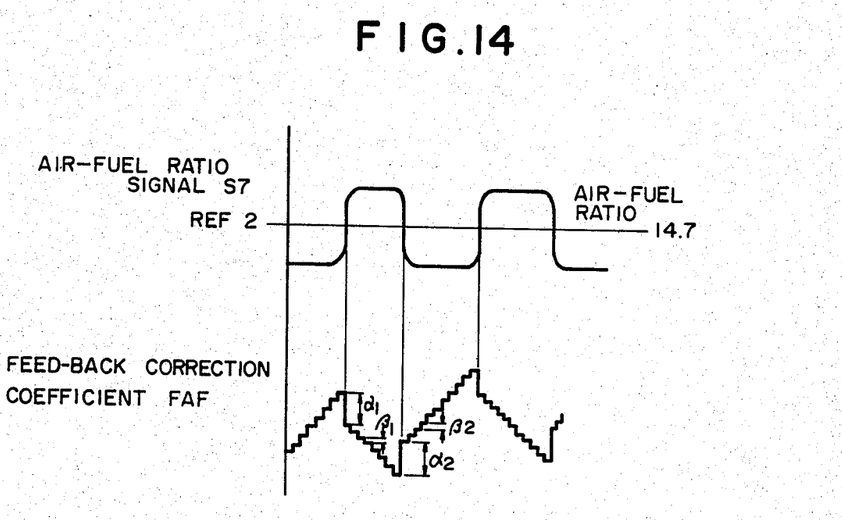
FIG. 14 is a time chart showing the relationship between the air-fuel ratio signal S7 and the feedback correction coefficient FAF.

The feedback correction coefficient FAF determined through this operation is shown in FIG. 14 together with the air-fuel ratio signal S7. The following will be noted from this Figure. Namely, when the signal S7 rises above the reference value REF2 or drops below the same, the correction coefficient FAF is skipped by an amount $\alpha 1$ or $\alpha 2$. Thereafter, when the signal S7 exceeds the reference value, the predetermined value $\beta 1$ is subtracted successively, whereas, if the signal S7 is below the reference value, the predetermined value $\beta 2$ is added successively.

In this embodiment, the mode of control of the air-fuel ratio is switched in accordance with the state of the engine operation between the lean control mode explained before and the feedback control mode in which the air-fuel ratio is controlled so as to be maintained around the stoichiometric level using the feedback correction coefficient FAF computed in a manner explained above. In this embodiment also, when the air-fuel ratio control mode is switched from the feedback control mode to the lean control mode and vice versa, the change of the ignition timing is delayed for a predetermined period of time in the transient period in the same manner as that explained before in connection with FIGS. 7 and 8.

It will be clear to those skilled in the art that the advantages of the invention can be obtainable when the invention is applied various types of engine in which there is a considerable delay of effect of the switching of the air-fuel ratio control mode from the lean control mode to the open loop control mode or the feedback control mode and vice versa. It will be also clear that the invention can be applied to engines having electronic carburetors.

Although in the described embodiment the switching of the ignition timing is effected abruptly after elapse of a predetermined time, this is not exclusive and the ignition timing may be changed linearly or progressively immediately after the switching of the control mode or from a moment which lags a predetermined time behind the switching of the control mode.

What is claimed is:

1. A method of controlling an air-fuel ratio and an ignition timing for an internal combustion engine, said method comprising the steps of:

detecting a condition of the engine to discriminate whether the engine is operated under a first operational condition in that at least a cooling water temperature is greater than a predetermined temperature and an engine load is less than a predetermined engine load;

detecting the condition of the engine to discriminate whether the engine is operated under a second operational condition in that at least the engine is not in cranking and accelerating conditions;

determining the ignition timing in such a manner that a first ignition timing optimum for the first operational condition is determined in response to detection of the first operational condition and a second ignition timing optimum for the second operational condition is determined in response to detection of the second ignition timing retarded with respect to the first ignition timing;

controlling the air-fuel ratio so as to become leaner than a stoichiometric air-fuel ratio when said first operational condition is detected and controlling the air-fuel ratio so as to become richer than the leaner air-fuel ratio when said second operational condition is detected; and controlling the ignition timing is such a manner that when the first operational condition is changed to the second operational condition, the first ignition timing is maintained for a predetermined period of time and after the predetermined period of time, the second ignition timing is maintained, and when the second operational condition is changed to the first operational condition, the second ignition timing is maintained for a predetermined period of time and after the predetermined period of time the first ignition timing is maintained.

2. A method of controlling the air-fuel ratio and the ignition timing according to claim 1, further comprising the step of: detecting the concentration of a predetermined component in an exhaust gas; wherein when said second operational condition is detected, the air-fuel ratio is feedback-controlled so as to be maintained substantially at the stoichiometric air-fuel ratio in accordance with the air-fuel ratio measured through the detection of the concentration of the predetermined component of the exhaust gas.

3. A method of controlling the air-fuel ratio and the ignition timing according to claim 1, including the steps of detecting engine speed and engine load, and wherein when said first operational condition is detected, the air-fuel ratio is open loop-controlled in accordance with an engine speed and the engine load without detecting the concentration of the predetermined component of the exhaust gas.

4. A method of controlling the air-fuel ratio and the ignition timing according to claim 1, further comprising the step of: detecting the concentration of a predetermined component in an exhaust gas; wherein said engine is provided with an injector at a upstream portion of a throttle valve disposed in an intake passage communicated with a combustion chamber of the engine through an intake manifold, said step of determining the air-fuel ratio including the steps of:

detecting engine speed and engine load;

computing a basic fuel injection time duration corresponding to a fuel injection rate of said injector in accordance with an engine speed and the engine load such that the air-fuel ratio becomes substantially the stoichiometric air-fuel ratio; and correcting said basic fuel injection time duration by using a lean correction coefficient so that a final injection time duration is determined, said lean correction coefficient being determined in accordance with the engine load such that the air-fuel ratio gets smaller with respect to the stoichiometric air-fuel ratio; and wherein said step of determining the ignition timing includes the steps of:

computing a basic advance angle for the ignition timing in accordance with an engine speed and the engine load; and correcting the basic advance angle so that a lean correction advance angle determined in accordance with said lean correction coefficient such that the lean correction advance angle gets smaller as said lean correction coefficient makes the air-fuel ratio decreases is added to said basic advance angle.

5. A method of controlling an air-fuel ratio and an ignition timing according to claim 4, wherein said step of correcting the basic advance angle includes the step of:

storing a plurality of the lean correction advance angles successively determined on the basis of the latest lean correction coefficient, and wherein the oldest lean correction advance angle out of plurality of the lean correction advance angles, is added to the latest basic advance angle, whereby change of the ignition timing is delayed behind change of the air-fuel ratio.

6. Apparatus for controlling an air-fuel ratio and an ignition timing for an internal combustion engine comprising:

means for detecting a condition of the engine to discriminate whether the engine is operated under a first operational condition in that at least a cooling water temperature is greater than a predetermined temperature and an engine load is less than a predetermined engine load;

means for detecting the condition of the engine to discriminate whether the engine is operated under a second operational condition in that at least the engine is not in cranking and accelerating conditions;

means for determining the ignition timing in such a manner that a first ignition timing optimum for the first operational condition is determined in response to detection of the first operational condition and a second ignition timing optimum for the second operational condition is determined in response to detection of the second ignition timing retarded with respect to the first ignition timing;

means for controlling the air-fuel ratio so as to become leaner than a stoichiometric air-fuel ratio when said first operational condition is detected and controlling the air-fuel ratio so as to become richer than the leaner air-fuel ratio when said second operational condition is detected; and means for controlling the ignition timing in such a manner than when the first operational condition is changed to the second operational condition, the first ignition timing is maintained for a predetermined period of time and after the predetermined period of time, the second ignition timing is maintained, and when the second operational condition is changed to the first operational condition, the second ignition timing is maintained for a predetermined period of time and after the predetermined period of time the first ignition timing is maintained.

7. Apparatus for controlling the air-fuel ratio and the ignition timing according to claim 6, further comprising means for detecting the concentration of a predetermined component in an exhaust gas; means responsive to detection of said second operational condition for feedback controlling the air-fuel ratio so as to be maintained substantially at the stoichiometric air-fuel ratio in accordance with the air-fuel ratio measured through the detection of the concentration of the predetermined component of the exhaust gas.

8. Apparatus for controlling the air-fuel ratio and the ignition timing according to claim 6, including means for detecting engine speed and means for detecting engine load, and means responsive to detection of said first operational condition for open-loop controlling the air-fuel ratio in accordance with the engine speed and the engine load without detecting the concentration of the predetermined component of the exhaust gas.

9. Apparatus for controlling the air-fuel ratio and the ignition timing according to claim 6, further comprising detecting means for detecting the concentration of a predetermined component in an exhaust gas; the engine being provided with an injector at a upstream portion of a throttle valve disposed in an intake passage communicated with a combustion chamber of the engine through an intake manifold, means for detecting engine speed and means for detecting engine load, computing means for computing a basic fuel injection time duration corresponding to a fuel injection rate of the injector in accordance with the engine speed and the engine load such that the air-fuel ratio becomes substantially the stoichiometric air-fuel ratio; and correcting means for correcting said basic fuel injection time duration by using a lean correction coefficient so that a final injection time duration is determined, said lean correction coefficient being determined in accordance with the engine load such that the air-fuel ratio gets smaller with respect to the stoichiometric air-fuel ratio; said computing means functioning such that a basic advance angle for the ignition timing is computed in accordance with an engine speed and the engine load; and said correcting means functioning such that the basic advance angle is corrected so that a lean correction advance angle is determined in accordance with said lean correction coefficient such that the lean correction advance angle gets smaller as said lean correction coefficient which makes the air-fuel ratio decreases is added to said basic advance angle.

10. Apparatus for controlling an air-fuel ratio and an ignition timing according to claim 4, wherein said correcting means includes storage means for storing a plurality of the lean correction advance angles successively determined on the basis of the latest lean correction coefficient, and wherein the oldest lean correction advance angle out of plurality of the lean correction advance angles, is added to the latest basic advance angle, whereby change of the ignition timing is delayed behind change of the air-fuel ratio.

* * * * *